Nov. 21, 1967     E. P. LIONS ET AL     3,353,799
FLUID TREATING APPARATUS AND PACKING
CONSTRUCTION THEREFOR
Filed May 12, 1964
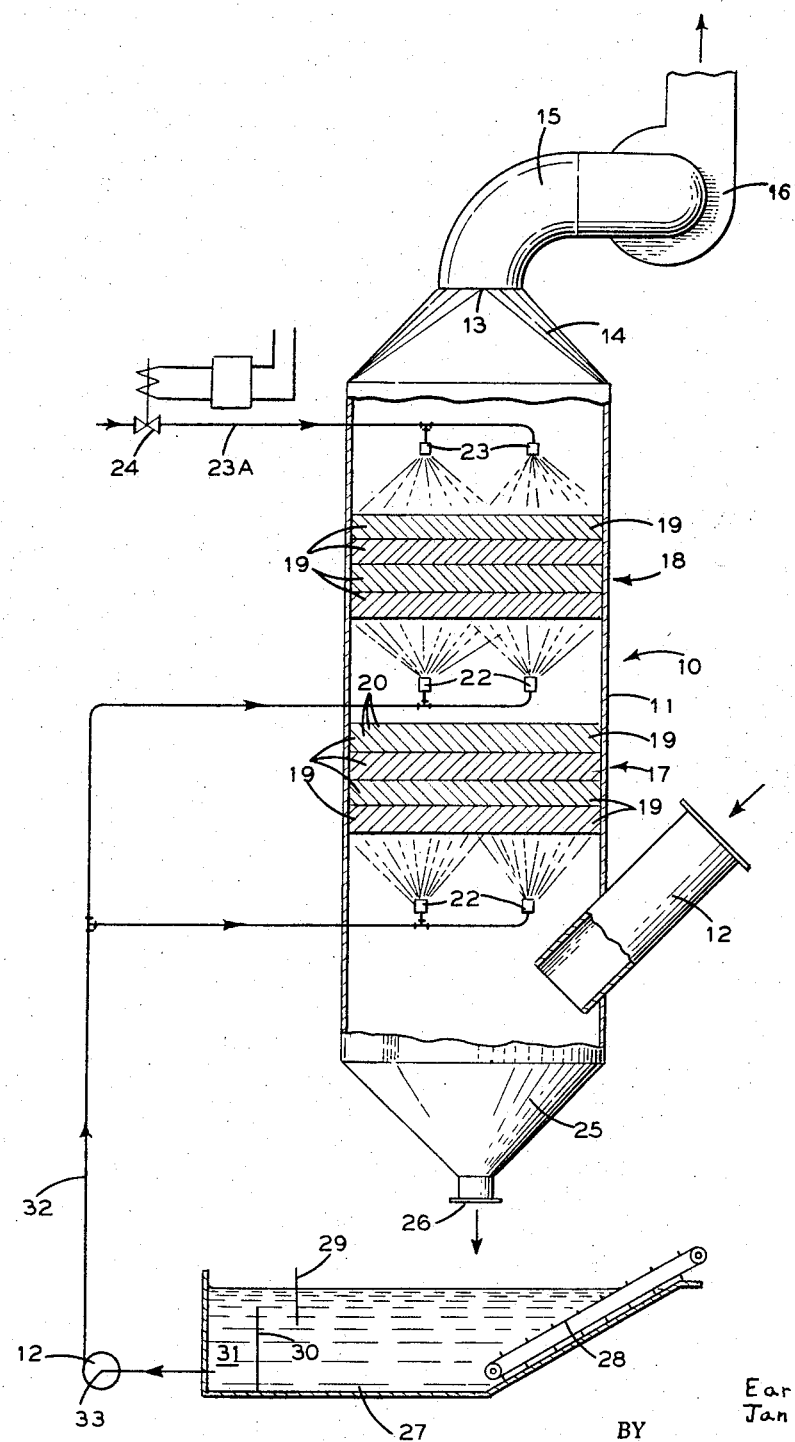
INVENTORS
Earl P. Lions
Jan vom Baur
BY
Frank J. Jordan
ATTORNEY United States Patent Office 3,353,799
Patented Nov. 21, 1967

3,353,799
FLUID TREATING APPARATUS AND PACKING CONSTRUCTION THEREFOR
Earl P. Lions, Brussels, Belgium, and Jan Vom Baur, Dusseldorf, Germany, assignors to American Radiator & Standard Sanitary Corporation, New York, N.Y., a corporation of Delaware
Filed May 12, 1964, Ser. No. 366,839
Claims priority, application Germany, June 22, 1963, J 23,751
2 Claims. (Cl. 261—3)

This invention relates in general to a fluid treating apparatus and to a packing construction therefor, and more specifically to an apparatus for the mass treating of fluids by flowing the same through an improved packing construction whereby the treatment of said fluids is enhanced.

The invention herein has wide range application and it is particularly useful in connection with apparatuses used for mass contacting of two or more fluid mediums whereby a change is affected in at least one of them, such as may occur in the absorption, cooling, drying; in the cleansing, humidifying or de-humidifying of liquids or gases; in the evaporation, cooling or heating of liquids or gases; in mixing and heating exchanging; in air scrubbing, air washing, filtering, aerating, oxygenation and diffusion; in the removal of solid matter and/or undesirable gaseous constituents; in the absorption of gases in liquids; absorption reaction; distillation, rectification, and in chemical reactions, and numerous other applications.

Numerous fluid treating and mass contacting apparatuses, employing various types of packing constructions, are known. However, the known packing constructions for such apparatuses usually consist of a coke or gravel bed. Also beds of glass spheres and Raschig-rings have been used as filters for bringing fluids into intimate mass contact. However, such known packing constructions or filtering beds have many disadvantages. One of the disadvantages of such known packing bed constructions is their inherent tremendous weight requirements. Also such packing bed constructions are easily soiled and the cleaning, repairing or replacing of the same present considerable difficulties. Further, the known filter or bed constructions are relatively expensive to install and maintain. This is particularly true of the glass sphere beds and of the Raschig-ring beds.

Accordingly, an object of this invention is to provide an improved apparatus for enhancing and facilitating the intimate contact or treating of fluids flowing therethrough whereby a change in at least one of the fluids is effected in a simple, expedient and positive manner.

Another object is to provide an improved packing construction for use in mass transfer apparatus in which the intimate contact of at least two fluids to effect a change in one of them is greatly enhanced.

Still another object is to provide an improved packing construction for use in mass transfer apparatus which is relatively light in weight, relatively simple and sturdy in construction, inexpensive to fabricate, and positive in operation.

Still another object is to provide an improved packing construction arranged to prohibit any unbalanced or unequal flow therethrough.

Still another object is to provide an improved packing construction which presents a maximum of useful working surface area to the fluid flow while offering a minimum of resistance thereto.

Another object is to provide an improved packing construction which can be readily cleansed, repaired and/or replaced with a minimum of effort and/or expense.

The foregoing objects and other features and advantages of this invention are attained by a fluid treating apparatus in which at least two fluids, for example, are brought into mass intimate contact with one another by flowing the same in either a co-flow or counter-flow relationship through a packing construction comprising one or more layers of unit cellular structure. In accordance with this invention, the unit cellular structure of each layer defines a lattice or honeycomb of connected tubular shaped passageways, the respective axes of which are inclined to the direction of the flow of fluid through the apparatus. Where the packing constructions comprise of two or more such layers of unit cellular structure, the respective layers are arranged in contiguous end to end relationship so that the respective axes of the passageways in the adjacent layers are oppositely inclined with respect to one another to define an included angle therebetween. In this manner, a lattice of zig-zag tubular shaped passageways extend through the layers of a composite packing so formed, the respective passageways being sized so as to provide for substantially unrestricted flow therethrough.

A feature of this invention resides in the provision that the packing construction comprises of one or more unit cellular structure in which the size or depth of a composite packing can be readily varied by stacking any desired number of such unit cellular construction in contiguous end to end relationship.

Another feature of this invention resides in the provision that the cellular unit structure making up the composite packing can be formed of relatively inexpensive material, as for example, paper suitably coated or impregnated as with a plastic resin, or a paper formed with wettable surface such as to produce a blotter effect that will insure liquid film formation thereon.

Other objects and features of the invention will appear as the description of a particular physical embodiment selected to illustrate the invention progresses.

For a better understanding of the present invention, reference should be had to accompanying drawings wherein like numerals of references indicated similar parts throughout the several views and wherein, The figure is a diagrammatic view of an apparatus embodying the present invention and having parts thereof shown in section.

Referring to the drawing, there is shown merely for the purposes of description and illustration, a mass contact apparatus 10 embodying the present invention for application as a wet dust collector. However, it will be understood that the fundamental concept of the invention has a much wider range of application and can be utilized in most any process or apparatus in which a mass flow of two or more fluids are brought into intimate contact with one another to effect a change in at least one of them.

The apparatus 10 of the illustrated embodiment comprises a housing or chamber 11 which defines a flow path for the respective fluids to be brought into mass contact with one another. As shown, a duct 12 defining a fluid inlet for one fluid, as for example, dust laden air, is connected in communication with the lower end of the chamber 11. The outlet 13 for the dust free or clean air is formed in the upper end of the chamber and it is defined by a tapering transition section 14 which has its outlet 13 connecting to an air outlet duct 15. The discharge end of the outlet duct in turn connects to the intake side of a suction or induced fan or blower 16. It will thus be apparent that in operation, the blower 16 will cause the dust laden air entering through duct 12 to flow through the chamber 11 from inlet to outlet in a direction substantially parallel to the longitudinal axis of the housing 11.

In accordance with this invention, a packing construction is interposed in the flow path of the dust laden air within the chamber. As will be hereinafter described, the function of the packing construction is to remove the dust from the dust laden air passing therethrough.

In the illustrated embodiment, two such packing constructions 17, 18 are vertically spaced within the chamber 11. However, it will be understood that any suitable number of such packing constructions 17, 18 may be interposed in a fluid flow path as may be required for the given process or fluid treatment operation.

Each of the respective packings 17, 18 are similar in construction and consequently, the description of one will suffice for an understanding of the invention. Accordingly, each of the packing constructions 17, 18 comprises of one or more layers 19 of a cellular structure of unit construction, and they are arranged so as to be stacked in contiguous end to end relationship. In the illustrated embodiment, the packing 17, 18 each comprise four such layers of cellular structures of unit construction arranged in superimposed stacked relationship. Each of the respective layers 19 are similarly constructed and each is formed to define a lattice of connected tubular shaped passageways 20 in which the wall portions of the respective passageways are inclined with respect to the longitudinal axis of the housing and to the flow of the fluid therethrough. While the angle of inclination of the respective passageways 20 is not critical, a slope or inclination of 45° to the flow of the fluid through the housing has been discovered to be favorable. It will be noted that the geometry of the lattice construction or of its respective cellular passageways may assume any convenient tubular cross-section configuration. However, a honeycomb or hexagonal configuration has found favor. Accordingly, each layer 19 is provided with a relatively large number of inclined passageways 20, each running in the same direction and at the same angle within a given layer.

The illustrated honeycomb cellular structure making up respective layers 19 can be inexpensively mass produced by existing or known machinery, and the unit construction of the honeycomb renders the layers easy to handle. The honeycomb layers can also be fabricated of relatively inexpensive materials.

In accordance with this invention, when a plurality of such unit layer constructions 19 are utilized to make up a packing, they are stacked in superimposed or contiguous end to end relationship and arranged so that the passageways in one layer slope in one direction with respect to the direction of fluid flow and passageways of the next adjacent layer slope in another or opposite direction with respect to the direction of the fluid flow with the adjacent end portions of the respective sloping passageways of the respective superposed layers being disposed in communication with one another. Accordingly, the connected passageways 20 of the successive layers define a continuous zig-zag path through the superposed layers 19 of cellular structures. As shown in FIG. 1, the passageways 20 of the stacked or contiguously disposed layers 19 define in cross-section a lattice of zig-zag passageways extending through the depth of the packing. With the respective passageways inclined at substantially a 45° angle, the included angle defined by the axes of adjacent superposed passageways approximates 90°.

In accordance with this invention, the cross sectional area of the respective passages 20 of the individual layers are sufficiently large so as to permit the free or unrestricted flow of fluid therethrough so as to minimize pressure drop therethrough. Accordingly, a maximum of fluid treating surfaces is thus provided with a minimum of loss in the system.

If desired the celludar structure may be made from such inexpensive materials such as paper or paper coated with plastic resin and the like or any other suitable light weight material. Thus the cellular structure is rendered extremely light and can be made at relatively low costs.

In the illustrated invention, the layers 19 of the respective packings as applied in a wet dust collector are intensely moistened by a second fluid, as for example, water. This is attained by the inclusion spray nozzles 22 disposed immediately below the lower layers of the respective packing constructions 18, 19. Also a set of nozzles 23 is disposed above the upper layer of the upper most packing 18. Accordingly, the arrangement is such that the nozzles 22, 23 will provide in the operation of the system, a spray which will maintain the respective packings 17, 18 wet.

In operation, the layers of the respective packings 17, 18 are intensely moistened from the spray of the respective nozzles 22 disposed thereunder. Thus, the dust laden air introduced through inlet 12 and flowing upwardly through the housing 11 is brought into initimate contact with the water wetted layers 19 of the respective packing structure 17, 18. In doing so, the dust laden air will carry part of the water up to a certain height of the bottom layer. Thus a close whirling between the air and water is effected in the respective passageways to result in an excellent washing effect. Also the arrangement of the passageways through the packings is such as to effect a turning of the air flow in passing up from the passageway of one layer to the passageway of the next adjacent layer, thereby causing the dust particles to be separated therefrom by a centrifugal action which throws the particles outwardly to the side of the passageways.

Soiling in the upper portion of the bottom packing is prohibited due to the water dropping down from the next upper packing spaced thereabove, thus continously washing away adherent dust particles. Accordingly, the upper packing of the illustrated arrangement of FIG. 1 serves as a micro dust collector and a moisture eliminator, and it is additionally supplied at intermittent intervals with makeup water from nozzles 23 above. Accordingly, nozzles 23 are supplied by conduits 23A which connect to a source of fresh water supply not shown. A solenoid operated valve 24 is disposed in line 23A to control the flow therethrough.

As shown in FIG. 1, the lower end of the chamber 11 is defined by a transition section 25 which converges to define a sludge opening 26 in the bottom of the housing and which discharges to a sludge tank 27 disposed therebeneath. The sludge tank 27 in turn is provided with a conveyor 28 adjacent one end thereof to remove the sludge therefrom. The opposite end of the tank 27 is provided with cooperating baffles 29, 30 to define a chamber 31 for receiving the water of the sludge tank whereby it is roughly purified. Accordingly, a circulating system 32 including pump 33 is provided for recirculating the roughly purified water to the nozzles 22 wetting the respective packings 17, 18 from below.

If desired, the dust laden air may be introduced into the lower part of the housing so as to have imparted thereto a whirling motion which effects a primary separation of the larger particles from the dust laden air by a centrifugal action, the particles separating therefrom bounding against the wall of the housing 11 where they lose their momentum and are washed out through the sludge opening 26.

The dust laden air with the smaller and lighter entrained particles are directed upwardly through the housing 11 wherein a secondary separation occurs as the air passes through the zig-zag passageways 20 of the respective moistened packing construction hereinbefore described.

It will be noted that from the foregoing discussion, the cellular structure of each layer 19 defines a lattice of passageways 20 which incline relative to the flow of the fluid and thereby presents the maximum amount of surface area to the flow of the fluid flowing therethrough and thus effects an expedient and effective fluid treating surface arrangement. The respective cellular structures 19 are extremely light and simple in construction. Also the unit construction thereof is readily supportable and handled as a unit, and a packing made up of a number of such layers can be readily stacked one on the other to form packings of various sizes.

While the instant invention has been described with reference to a particular embodiment thereof, it will be readily appreciated and understood that variations and modifications of the invention may be made without departing from the spirit or scope of the invention.

What is claimed is:
1. A wet dust collection apparatus comprising,
(a) an elongated chamber having its longitudinal axis vertically disposed,
(b) means for introducing dust laden air into said chamber adjacent its lower end and in a downward direction, at an angle to the axis of said elongated chamber,
(c) means defining a pure air outlet formed in the upper end of said chamber,
(d) means for circulating the dust laden air from said inlet to said outlet,
(e) a plurality of packing constructions disposed in said chamber between said inlet and said outlet,
(f) said packing construction being vertically spaced in said chamber,
(g) each of said packing constructions including a plurality of layers of unit cellular structures,
(h) each of said cellular structures defining a lattice of tubular shaped passageways extending through its respective layers,
(i) each of said passages of each of said layers having its central axis inclined at substantially 45° to the flow of air through said chamber,
(j) and each of said layers of the respective packing constructions being disposed in end to end relationship so that the respective passageways of adjacent layers are oppositely inclined to define a lattice of zig-zag passageways extending through the respective packings constructions,
(k) means for intensely moistening the respective layers of said packing constructions with a liquid whereby the air flowing through the respective packing is washed by the liquid wetting the same, said means including spray nozzles positioned above the uppermost packing construction and directed downwardly and below each of said packing constructions and directed upwardly,
(l) means formed in the bottom of said chamber to define an outlet for the sludge resulting from the washing of the air,
(m) a sludge collector disposed beneath said sludge outlet for receiving the sludge,
(n) a conveyor means for removing the residue of said sludge from said recesses,
(o) means for recirculating the liquid of said sludge collector to said upwardly directed spray nozzles,
(p) means for supplying fresh liquid to the uppermost spray nozzle.

2. The apparatus of claim 1 wherein said plurality of layers of unit cellullar structure are honeycombed in configuration.

References Cited

UNITED STATES PATENTS

| | | | |
|---|---|---|---|
| 2,152,574 | 3/1939 | Turner | 261—112 |
| 2,394,755 | 2/1946 | Flon. | |
| 2,457,658 | 12/1948 | Graham | 261—112 X |
| 2,571,958 | 10/1951 | Slaughter et al. | 261—95 |
| 2,585,440 | 2/1952 | Collins | 210—150 |
| 2,695,773 | 11/1954 | McGrath. | |
| 3,227,429 | 1/1966 | Renzi | 261—112 |

FOREIGN PATENTS

| | | |
|---|---|---|
| 684,545 | 3/1930 | France. |
| 233,171 | 10/1944 | Switzerland. |

RONALD R. WEAVER, *Primary Examiner.*

FRANK W. LUTTER, HARRY B. THORNTON,
*Examiners.*